(12) United States Patent
Prentice (10) Patent No.: US 12,271,400 B2
(45) Date of Patent: *Apr. 8, 2025

(54) METHOD, APPARATUS, AND COMPUTER READABLE MEDIUM FOR QUANTITATIVELY GROUPING USING COMPUTATIONAL CLUSTERING

(71) Applicant: KEEP COMPANY, INC., Bethesda, MD (US)

(72) Inventor: Adrienne Prentice, Bethesda, MD (US)

(73) Assignee: KEEP COMPANY, INC., Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,108

(22) Filed: Nov. 21, 2023

(65) Prior Publication Data

US 2024/0086427 A1    Mar. 14, 2024

Related U.S. Application Data

(63) Continuation of application No. 17/829,149, filed on May 31, 2022, now Pat. No. 11,860,908.

(60) Provisional application No. 63/194,402, filed on May 28, 2021.

(51) Int. Cl.
    *G06F 16/28*    (2019.01)

(52) U.S. Cl.
    CPC .......... *G06F 16/285* (2019.01); *G06F 16/283* (2019.01)

(58) Field of Classification Search
    CPC ...... G06F 16/285; G06F 16/283; G06F 16/90; G06F 16/906
    See application file for complete search history.

(56) References Cited

U.S. PATENT DOCUMENTS

| | | | |
|---|---|---|---|
| 8,396,870 B2 * | 3/2013 | Birdwell | G06F 16/24578 707/758 |
| 11,080,336 B2 * | 8/2021 | Van Dusen | G06Q 10/10 |
| 2010/0125562 A1 * | 5/2010 | Nair | G06F 16/951 707/E17.108 |
| 2014/0236953 A1 * | 8/2014 | Rapaport | G06F 16/285 707/740 |
| 2020/0184278 A1 * | 6/2020 | Zadeh | G06N 3/044 |

* cited by examiner

*Primary Examiner* — Merilyn P Nguyen
(74) *Attorney, Agent, or Firm* — Amardeep S. Grewal; Reed Smith LLP (57) ABSTRACT

A method, apparatus, and computer-readable medium for quantitatively grouping a set of persons into a plurality of groups of three or more persons using computational clustering, the method including storing a set of data objects corresponding to the set of persons, storing a plurality of attributes corresponding to each data object in the set of data objects, generating a plurality of multidimensional objects by encoding each data object in the set of data objects as a multidimensional object based at least in part on two or more attributes corresponding to that data object, each multidimensional object corresponding to a data object in the set of data objects, and generating the plurality of groups of three or more data objects based at least in part on applying a clustering algorithm to the plurality of multidimensional objects.

21 Claims, 11 Drawing Sheets

```
┌─────────────────────────────────────────────────────────────────────┐
│ Apply a clustering algorithm to the plurality of multidimensional   │
│ objects to generate a plurality solution sets, each solution set    │
│ comprising a plurality of clusters of multidimensional objects,     │
│ each cluster of multidimensional objects comprising at least three  │
│ multidimensional objects                                            │
│                                                                     │
│                               401                                   │
└─────────────────────────────────────────────────────────────────────┘
                                 │
                                 ▼
┌─────────────────────────────────────────────────────────────────────┐
│ Remove one or more solution sets from the plurality of solution     │
│ sets to generate a filtered plurality of solution sets based at     │
│ least in part on one or more attributes of one or more data objects │
│ corresponding to one or more multidimensional objects in one or     │
│ more clusters of each removed solution set                          │
│                                                                     │
│                               402                                   │
└─────────────────────────────────────────────────────────────────────┘
                                 │
                                 ▼
┌─────────────────────────────────────────────────────────────────────┐
│ Select a solution set from the filtered plurality of solution sets  │
│ based at least in part on one or more weights associated with one   │
│ or more attributes in the plurality of attributes                   │
│                                                                     │
│                               403                                   │
└─────────────────────────────────────────────────────────────────────┘
                                 │
                                 ▼
┌─────────────────────────────────────────────────────────────────────┐
│ Group the plurality of data objects according to the plurality of   │
│ clusters defined in the selected solution sets                      │
│                                                                     │
│                               404                                   │
└─────────────────────────────────────────────────────────────────────┘
```

METHOD, APPARATUS, AND COMPUTER READABLE MEDIUM FOR QUANTITATIVELY GROUPING USING COMPUTATIONAL CLUSTERING

RELATED APPLICATION DATA

This application is a continuation of U.S. Nonprovisional application Ser. No. 17/829,149, filed May 31, 2022 and issued as U.S. Pat. No. 11,860,908 B2, which itself claims priority to U.S. Provisional Application No. 63/194,402, filed May 28, 2021, the disclosures of which are hereby incorporated by reference in their entirety.

BACKGROUND

Current ranking and matching systems involving users are typically targeted to matching a user with another user (e.g., for online dating), matching a group of users for particular event (e.g., for meetup groups), or matching the interests of particular user to an activity or product (e.g., for advertisements).

These matching systems are not designed or capable of performing the more sophisticated process of constructing an optimal set of user groups out of a population of users, based upon not only the individual characteristics, attributes, values, and interests of each user, but also the interactions between the attributes and values of users within each group, the overall group dynamic, and the configuration of persons into groups that optimizes results for the maximum number of people.

Accordingly, improvements are needed in systems for quantitatively grouping persons into groups.

BRIEF DESCRIPTION OF THE DRAWINGS

Current ranking and matching systems involving users are typically targeted to matching a user with another user (e.g., for online dating), matching a group of users for particular event (e.g., for meetup groups), or matching the interests of particular user to an activity or product (e.g., for advertisements).

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate also comprise a portion of the invention. However, because such elements do not facilitate a better understanding of the invention, a description of such elements is not provided herein.

Applicant has discovered a method, apparatus, and computer-readable medium for quantitatively grouping a set of persons into a plurality of groups of three or more persons using computational clustering that improves computer technology in the field of computational matching and ranking.

Unlike existing matching and ranking technologies, which are some form of a matching process that matches each user with another user or each user with a particular interest or activity, the presently disclosed process is configured to optimize the grouping of persons within a population.

This process is far more computationally complex than simple matching, due to the exponentially increasing number of permutations as the population size increases. For example, given a population of 100 people having certain attributes and requirements, and possible group sizes of 3-10 people, there are a large number of possible groupings of people that would meet the requirements of the population.

Simple matching approaches which are designed to optimize one-to-one matches between users or between users and activities or advertisements cannot be applied to population level grouping problems. This is because these approaches consider each match in isolation, as each match does not have an effect on the overall population of users. These approaches are not applicable to population grouping because they optimize only individual matches for users and do not optimize results for the entire group. By contrast, in population grouping, even if a set of users that have been grouped together are optimally matched, the solution is not an optimal solution if it does not maximize results across all groupings of users from the population.

In an exemplary embodiment, the disclosed method, apparatus, and computer-readable medium for quantitatively grouping a set of persons into a plurality of groups of three or more persons using computational clustering is used to group a population of caregivers or a subset of caregivers (e.g., mothers) into groups or "circles" based on attributes of the population of caregivers. These attributes can be derived based upon, for example, characteristics, values and/or interests of the population and individuals within it. This can aid mothers (or fathers or other caregivers) in finding inclusive, like-minded, and accessible groups of individuals to form support networks and relationships and exchange advice.

Figure 1:
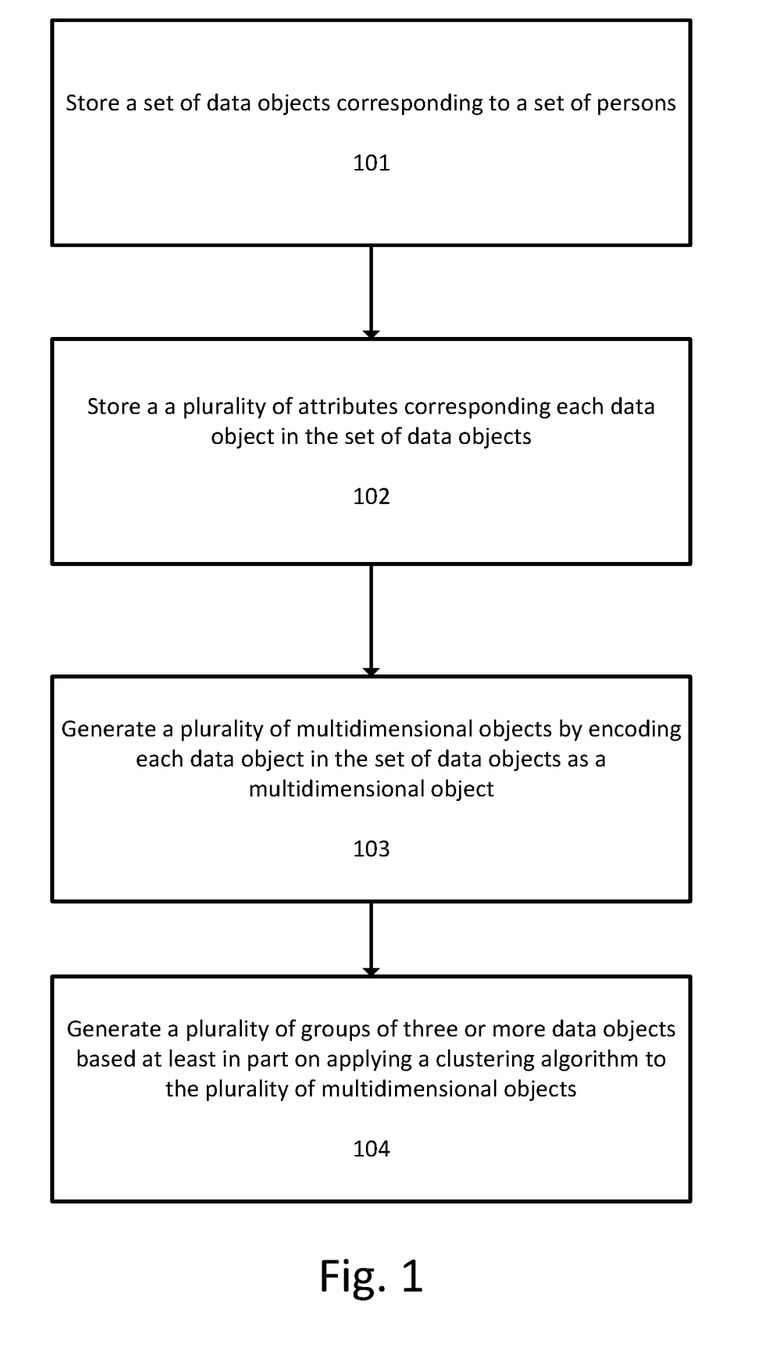
FIG. 1 illustrates a flowchart for quantitatively grouping a set of persons into a plurality of groups of three or more persons using computational clustering according to an exemplary embodiment.

FIG. 1 illustrates a flowchart for quantitatively grouping a set of persons into a plurality of groups of three or more persons using computational clustering according to an exemplary embodiment.

At step 101 a set of data objects corresponding to a set of persons are stored. The data objects can take any suitable form. For example, the data objects can be rows of a person database or table. The data objects can also be objects in an object oriented language, such as a user-defined class, a structure, an array, or some other suitable structure. These examples are provided for illustration only and are not intended to be limiting.

At step 102 a plurality of attributes corresponding to each data object in the set of data objects are stored. Once again, the storage of the attributes can take any suitable form. For example, the attributes can be stored in individual columns of a table or a database, or be stored as variables within a specialized person data object, such as a person struct object. Many variations are possible.

Figure 2:
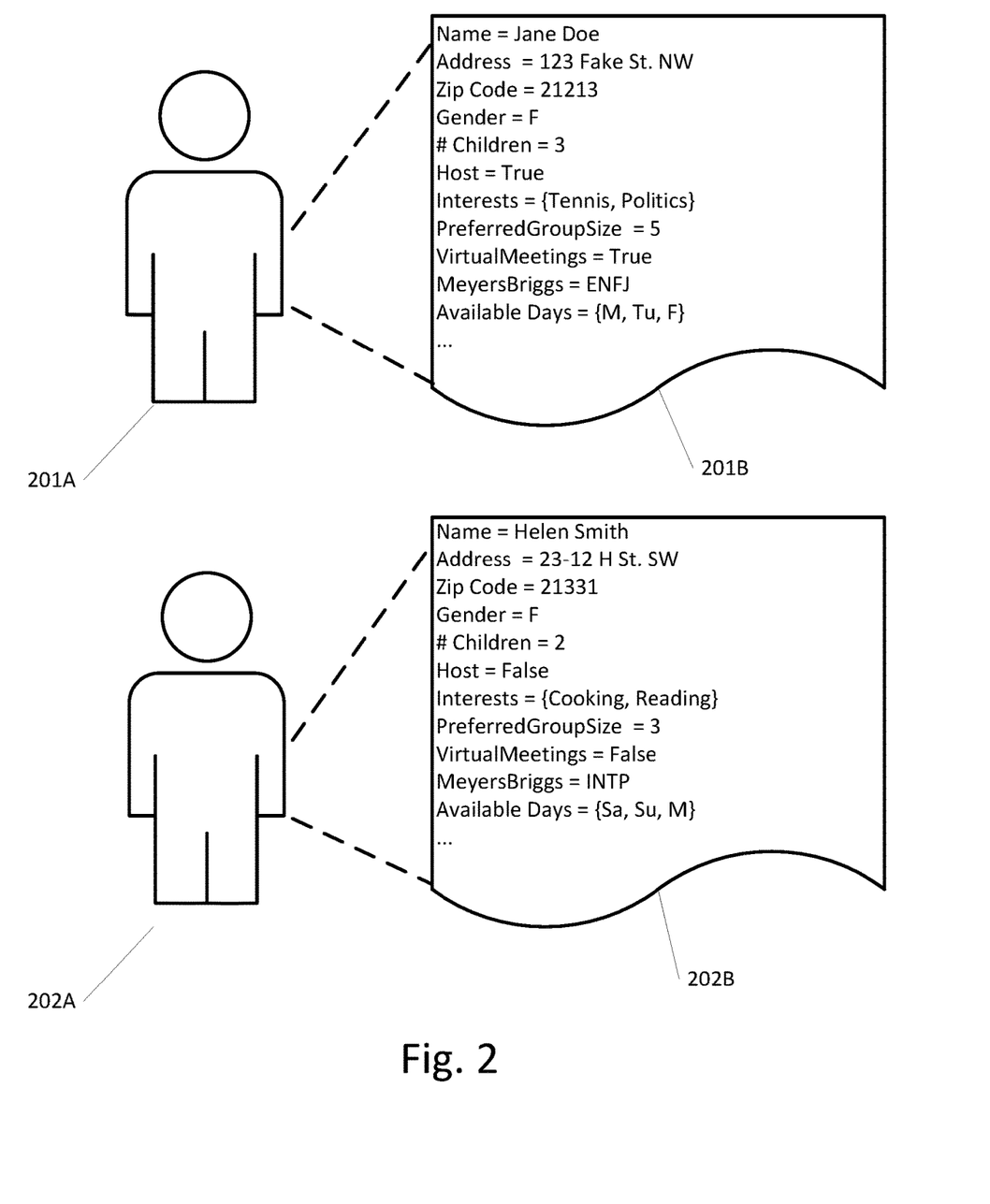
FIG. 2 illustrates two examples of data objects corresponding to persons and associated attributes according to an exemplary embodiment.

FIG. 2 illustrates two examples of data objects corresponding to persons and associated attributes according to an exemplary embodiment. Data object 201B corresponds to person 201A and data object 202B corresponds to person 202A. As shown in FIG. 2, each of the data objects includes a plurality of attributes. The attributes can be stored as variables within the data objects. For example, the Name attribute and the Address attribute can be stored as string variables, the Number of Children attribute can be stored as an integer, and the Host attribute and VirtualMeetings attribute (explained below) can be stored as Boolean values. In another example, the Interests attribute can be stored as an array of strings or as a single sting. Many variations are possible and these examples are not intended to be limiting.

The values of the attributes can be provided directly by users through a user interface. For example, the Name, Address, Zip Code, and Gender attributes can be entered by a user through a user interface when the user signs up for the group matching service.

The values of the attributes can also be automatically generated or derived from information provided by the user through a user interface. For example, a user may be asked to answer a set of personality questions, resulting in a Myers-Briggs personality type being assigned to the user in a MeyersBriggs attribute. In another example, the attributes can be generated or derived based on answers to an assessment, such as the well-being assessment shown below.

| Behavior Change/Outcome | Survey Question Answers offered on sliding 5-point scale. Questions asked in Circle registration form and in post-program survey. |
|---|---|
| Take better care of themselves mentally & physically | 1. I take care of my mental health, including paying attention to how I am feeling and processing my emotions. [Never → Always] <br> 2. I nurture my physical body, including getting adequate sleep, healthy food & body movement. [Never → Always] <br> 3. I devote meaningful time to my personal interests and hobbies. [Never → Always] |
| Act with more confidence, presence and intention (home & office) | 4. I am a good mom. [Never → Always] <br> 5. I am a good employee. [Never → Always] <br> 6. I take my own values, goals and intuition into account when making decisions. [Never → Always] |
| Ask for help (home & office) | 7. I ask for help when I need it. <br> At work: [Never → Always] <br> At home: [Never → Always] |
| Cope with stress better | 8. My coping strategies in stressful times are: [Terrible → Excellent]. |
| Feel more in control | 9. I feel stuck or unable to progress. <br> At work: [Never → Always] <br> At home: [Never → Always] |
| Feel more belonging, connection & community (home & office) | 10. I feel connected to myself; I know who I am. [Not at all → Completely] <br> 11. I feel like I can bring my whole self (all aspects of me, including my Motherhood) to work. [Not at all → Completely] <br> 12. I feel lonely in my daily life. [Never → Always] <br> 13. I have a community that provides emotional support and motivation. [Not at all → Completely] |
| Loyal to employer (retention) | 14. I consider exiting the workforce or reducing my hours. [Never - Monthly - Daily] |
| Communicate more effectively | 15. I supportively listen to others. [Never → Always] <br> 16. I clearly communicate with others. [Never → Always] |
| More productive | 17. I work smart: I use systems to evaluate and prioritize my responsibilities and keep clear boundaries to reinforce my efforts. <br> At work: [Never → Always] <br> At home: [Never → Always] |

Other questions that can be used to derive attributes can include questions about group dynamics (e.g., "how comfortable are you sharing with a group?"), questions about readiness for change/growth (e.g., "are you open to trying new things?), questions about how participants feel at work, and/or questions about inclusivity and belonging.

Other examples of generated or derived attributes include distance based metrics. For example, a user can provide an address and the system can utilize a Global Positioning System and/or map databases to determine a distance from the user's residence to the nearest playground. This may be a relevant attribute when forming groups of mothers, as discussed earlier.

Other attributes can be Boolean (true/false) attributes indicating a user's preferences or answers to questions. For example, in the case of forming groups of mothers, each mother can be asked whether she can act as a host for the other mothers and their children. If the mother can act as a host, then the Host attribute can be set to true, otherwise it is set to false. Each mother can also be asked whether she is available for virtual meetings (e.g., via videoconferencing/teleconferencing software). This attribute can also be stored as true/false value.

The attributes corresponding to each data object can include, for example, a name, an address, a zip code, a quantity of children, a gender, a gender of a child, an interest, a hobby, a preferred group size, an indicator of hosting ability, an indicator of virtual communications ability, a personality indicator, a maximum travel distance, a transportation means, an availability attribute, an age of a child or children, an experience type (i.e., blended families, raising special needs kids, first time mom over 40, etc.), race, a well-being indicator (i.e., resulting from an assessment both pre-grouping and post-grouping], a goal (i.e., caregivers can be asked why they are joining a Circle/group with multiple choice answers including community, friendship, accountability, personal growth, empathy, parenting resources, etc.), household income, employment status, profession, role and/or function (i.e., entry-level employees, mid-level, executives), caregiving responsibilities (i.e., who the caregiver cares for, that person's condition, etc.), matching preferences for whether participant prefers to match with moms, dads, any parents (mother or father), or any caregivers (e.g., grandparents, nannies, or other caregivers).

The maximum travel distance attribute can indicate the maximum distance the user is willing to travel to meet with the group. The transportation means attribute can indicate, for example, different means of transportation available to the user (e.g., bus, car, train, etc.).

As shown in FIG. 2, the availability attribute can be a listing of available days for each person. A second availability attribute can also be utilized to indicate available time slots or time periods within each day.

A PreferredGroupSize attribute can be used to store the preferred group size for each person. This value can be entered by the user during registration and/or as part of the process of being assigned to a group. For example, some mothers may wish to have large groups of people and other mothers may be more introverted and wish to have more intimate groups.

In addition to all the attributes shown in FIG. 2 and discussed above, a second set of attributes can be stored corresponding to at least some of the above-mentioned attributes that indicate a weight or rank of a corresponding attribute. This weight or rank or importance can be entered by a user in a user interface when providing the attribute information or information that is used to derive attributes.

Using the above example of preferred group size, a user can enter a preferred group size and also enter a weight, rank, or importance to be associated with their selected preferred group size. For example, one or more attributes or input fields within the interface can have an associated "importance" indicator or input option. The importance indictor can allow a user select an importance level of the particular attribute (e.g., from 1-10). In another example, a user can rank one or more attributes in order of importance. For example, a user may rank the #Children attribute $1^{st}$, indicating that it is most important to them to be grouped with others who have the same number of children, the maximum distance attribute $2^{nd}$, and the preferred group size attribute $3^{rd}$.

Returning to FIG. 1, at step 103 a plurality of multidimensional objects are generated by encoding each data object in the set of data objects as a multidimensional object based at least in part on two or more attributes corresponding to that data object, with each multidimensional object corresponding to a data object in the set of data objects. As explained further below, the multidimensional objects are utilized to generate multiple solution sets with different groupings (clusters) of users/data objects.

Figure 3:
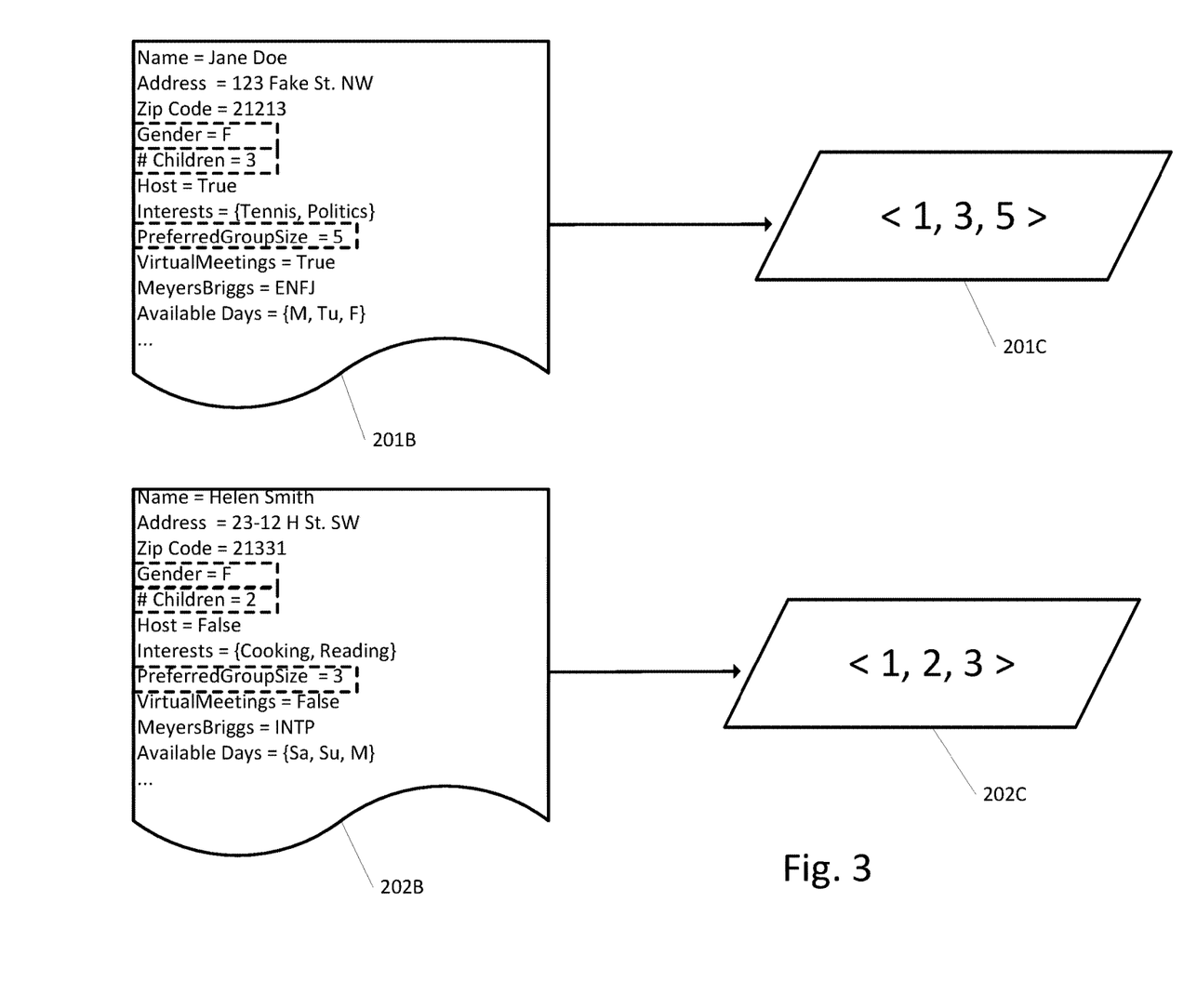
FIG. 3 illustrates an example of encoding data objects as multidimensional objects according to an exemplary embodiment.

FIG. 3 illustrates an example of encoding data objects as multidimensional objects according to an exemplary embodiment. As shown in FIG. 3, three attributes of each data object, 201B and 202B are used to generate multidimensional objects 201C and 202C. Note that the quantity and selection of attributes used to generate the multidimensional objects can be user-configured and/or set to some default value and more or less attributes or different attributes can be utilized. Each multidimensional object, in this case, is a three-dimensional value with one dimension corresponding to gender (which is represented as a Boolean in this example, with female corresponding to "1"), one dimension corresponding to the #Children attribute, and one dimension corresponding to the PreferredGroupSize attribute. Of course, other attributes can be represented in the multidimensional object in addition to or in place of these attributes.

As shown in FIG. 3, the step of generating a plurality of multidimensional objects by encoding each data object in the set of data objects as a multidimensional object based at least in part on two or more attributes corresponding to that data object includes mapping a value of each attribute in the two or more attributes to a different dimension of the multidimensional object, each dimension corresponding to a range of possible values of the mapped attribute.

Returning to FIG. 1, at step 104 a plurality of groups of three or more data objects are generated based at least in part on applying a clustering algorithm to the multidimensional objects. The clustering algorithm can be any suitable clustering algorithm, such as k-means clustering.

Figure 4:
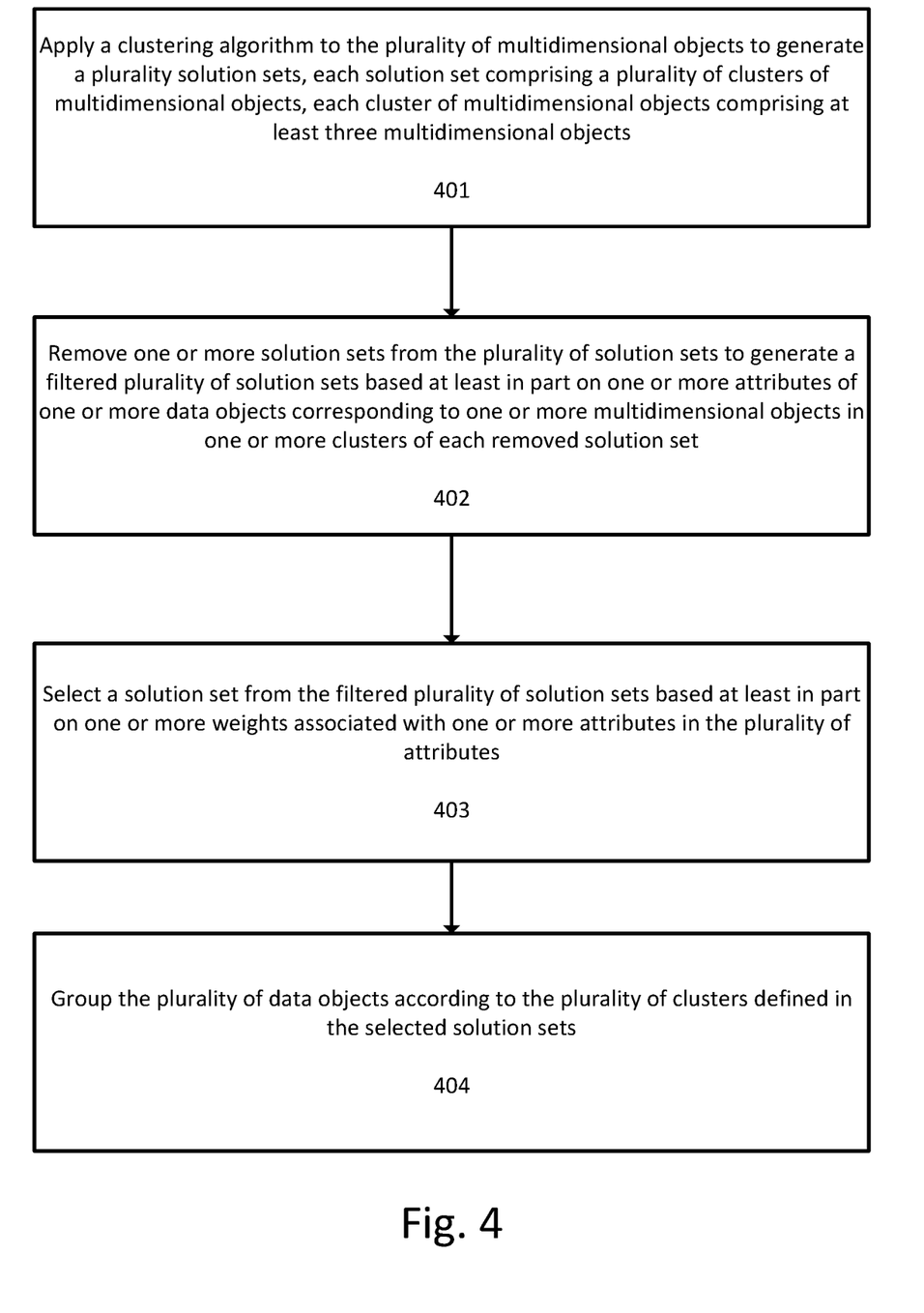
FIG. 4 illustrates a flowchart for generating a plurality of groups of three or more data objects based at least in part on applying a clustering algorithm to the multidimensional objects according to an exemplary embodiment.

FIG. 4 illustrates a flowchart for generating a plurality of groups of three or more data objects based at least in part on applying a clustering algorithm to the multidimensional objects according to an exemplary embodiment. Optionally, prior to performing the steps shown in FIG. 4, a pre-filtering or pre-sorting step can be applied to all multidimensional objects. For example, the MD objects can be sorted into groups based upon zip code and then the steps shown in FIG. 4 can be performed for each group. In this case, the step of generating the plurality of groups of three or more data objects based at least in part on applying a clustering algorithm to the plurality of multidimensional objects includes grouping the plurality of multidimensional objects into a plurality of multidimensional object groups based on one or more values of one or more dimensions of each multidimensional object. Steps 401-404 of FIG. 4 (described below) would then be performed for each multidimensional object group in the plurality of multidimensional object groups. The dimension(s) used for grouping can include zip code dimension, as indicated above, and/or other dimensions, such as a caregiver type matching preference (e.g., moms only, dads only, both, or other).

At step 401 the clustering algorithm is applied to the plurality of multidimensional objects to generate a plurality solution sets, each solution set comprising a plurality of clusters of multidimensional objects, each cluster of multidimensional objects comprising at least three multidimensional objects. Of course, the clustering algorithm can be configured such that each cluster of multidimensional objects comprises at least two multidimensional objects or such that each cluster of multidimensional objects comprises at least four or more multidimensional objects. A user configured parameter can be used to adjust the minimum quantity of multidimensional objects per cluster.

Figure 5A:
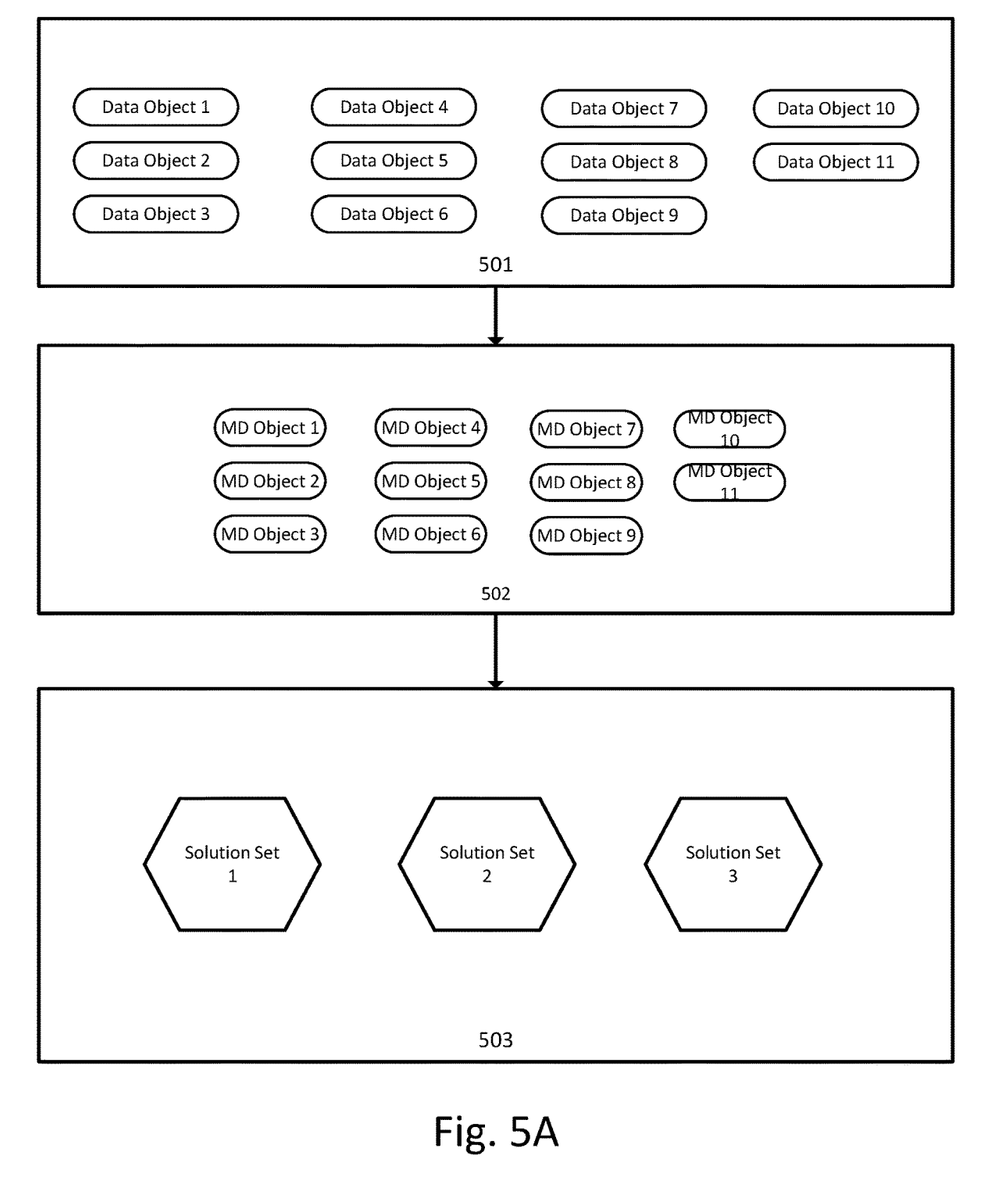
FIGS. 5A-5C illustrate an example of the clustering process according to an exemplary embodiment.
Figure 5B:
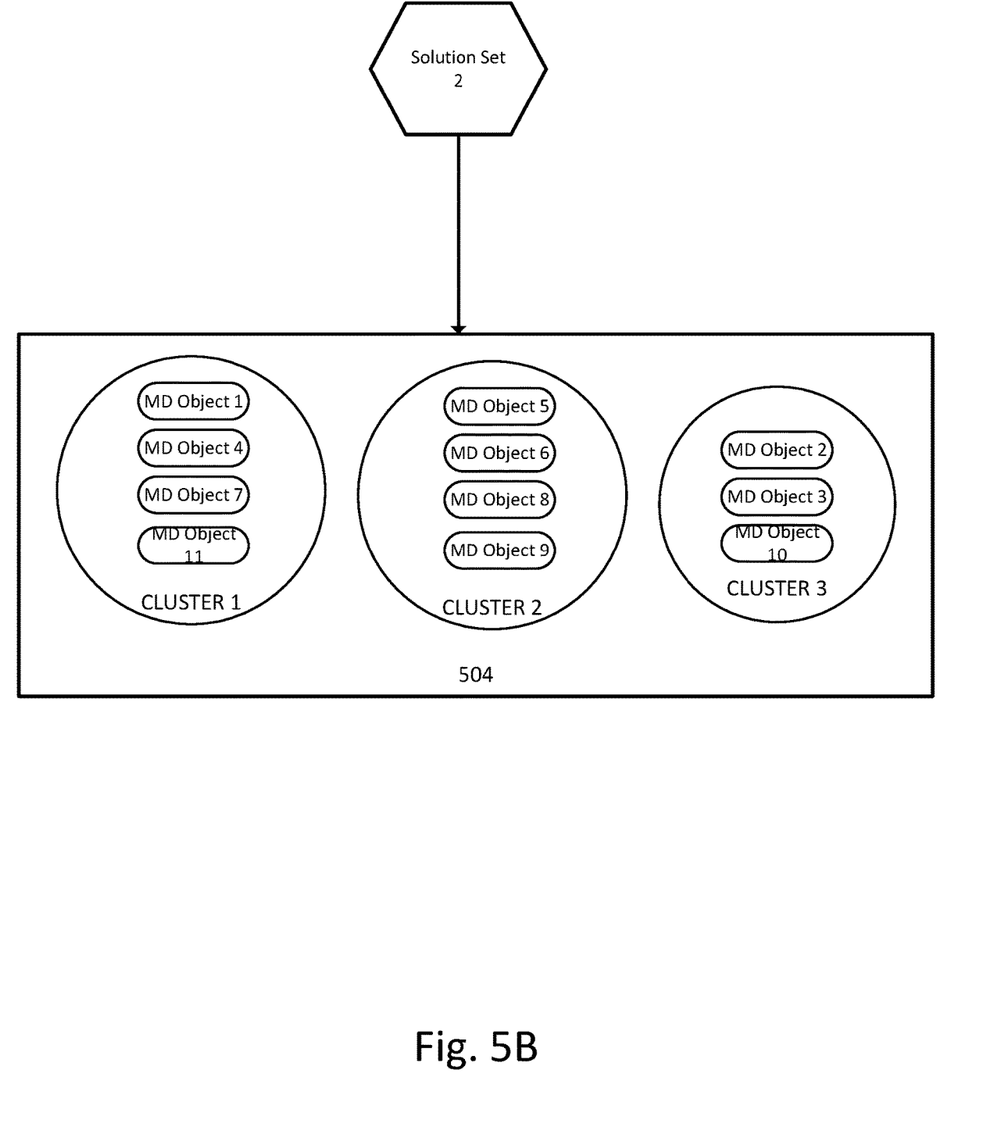
Figure 5C:
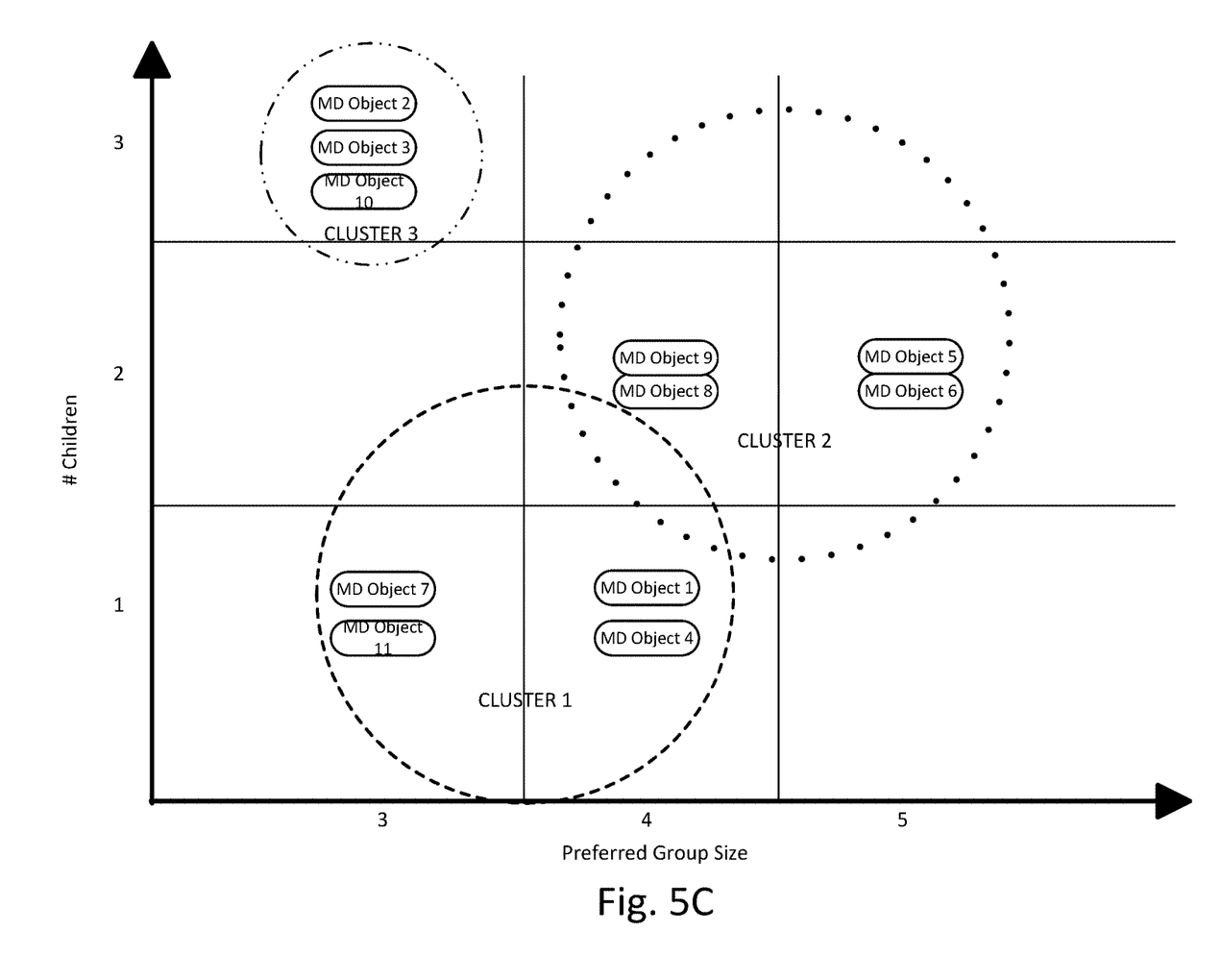

FIGS. 5A-5C illustrate an example of the clustering process according to an exemplary embodiment. As shown in FIG. 5A, a set of data objects 501 are used to generate a plurality of multidimensional objects ("MD objects") 502, with each MD object corresponding to a particular data object. This process is described earlier. A clustering algorithm is then applied to the plurality of MD objects 502 to generate a plurality of solution sets 503, with each solution set comprising a plurality of clusters of multidimensional objects, each cluster of multidimensional objects comprising at least three multidimensional objects.

The clustering step clusters the MD objects into clusters based upon the distance between each MD object and all other MD objects in the multidimensional space of the MD objects. For example, if the MD objects are two-dimensional, then the clustering algorithm groups MD objects into clusters based on an assessment of distances between each MD object and other MD objects in two dimensional space.

As discussed earlier, clustering can be performed using K-means clustering. Clustering of MD objects can also be performed using the Balanced Iterative Reducing and Clustering using Hierarchies ("BIRCH") method to cluster the input data objects. BIRCH is a robust clustering algorithm developed for analyzing large volumes of multivariate data. The algorithm is capable of ingesting input data in a continuous fashion. The clustering step when using BIRCH includes four steps, described below.

The first step is building a Clustering Feature ("CF") tree—during this stage input data is loaded into a B-tree like structure and data objects are agglomerated in the leaf nodes based on relative Euclidean distance between the data objects. Data objects merging threshold is an input parameter of the BIRCH algorithm and is set initially to a small value. When the input data is normalized to the [0, 1] interval, a relatively small merging threshold value, such as 0.0001 can be used. Additionally, as discussed below, the threshold value can be automatically corrected during a subsequent intermediate step.

The second step is CF tree condensing—this operation can be triggered when the CF tree exceeds a preset size. At this time the samples merging threshold can be recomputed and the CF tree can be rebuilt. A new value of the merging threshold can then be derived from the distance between entries in the existing CF tree.

The third step is global clustering—at this step the BIRCH clustering algorithm applies a regular clustering algorithm to information collected in the CF tree. For example, the BIRCH algorithm implementation can utilize two global clustering options: CF tree refinement and Hierarchical Clustering ("HC"). While HC is capable of producing finer granularity clusters, its run time is significantly longer and memory consumption is significantly higher than that of the CF tree refinement procedure.

The fourth step is cluster matching—during this step input data objects are matched with the clusters produced after the refinement step.

As explained previously, while the BIRCH algorithm is described above step, clustering methods other than BIRCH can be used during the clustering step. For example, clustering algorithms such as DB SCAN or K-means can be used to group the MD objects into clusters.

FIG. 5B illustrates one solution set, Solution Set 2, and the plurality of clusters 504 within that solution set according to an exemplary embodiment. As shown in FIG. 5B, the total number of clusters in this particular solution is three, with Cluster 1 having four MD objects, Cluster 2 having four MD objects, and Cluster 3 having three MD objects.

FIG. 5C illustrates a visualization of the clusters of Solution Set 2 in multidimensional space according to an exemplary embodiment. For the purposes of explanation and visualization, the multidimensional space is shown as a two dimensional space, with a first dimension corresponding to a #Children attribute and a second dimension corresponding to a Preferred Group Size attribute. Of course, the actual dimensionality of each MD object and the number of dimensions utilized when the clustering is performed can be greater than two.

Returning to FIG. 4, at step 402 one or more solution sets are removed from the plurality of solution sets to generate a filtered plurality of solution sets based at least in part on one or more attributes of one or more data objects corresponding to one or more multidimensional objects in one or more clusters of each removed solution set.

Figure 6:
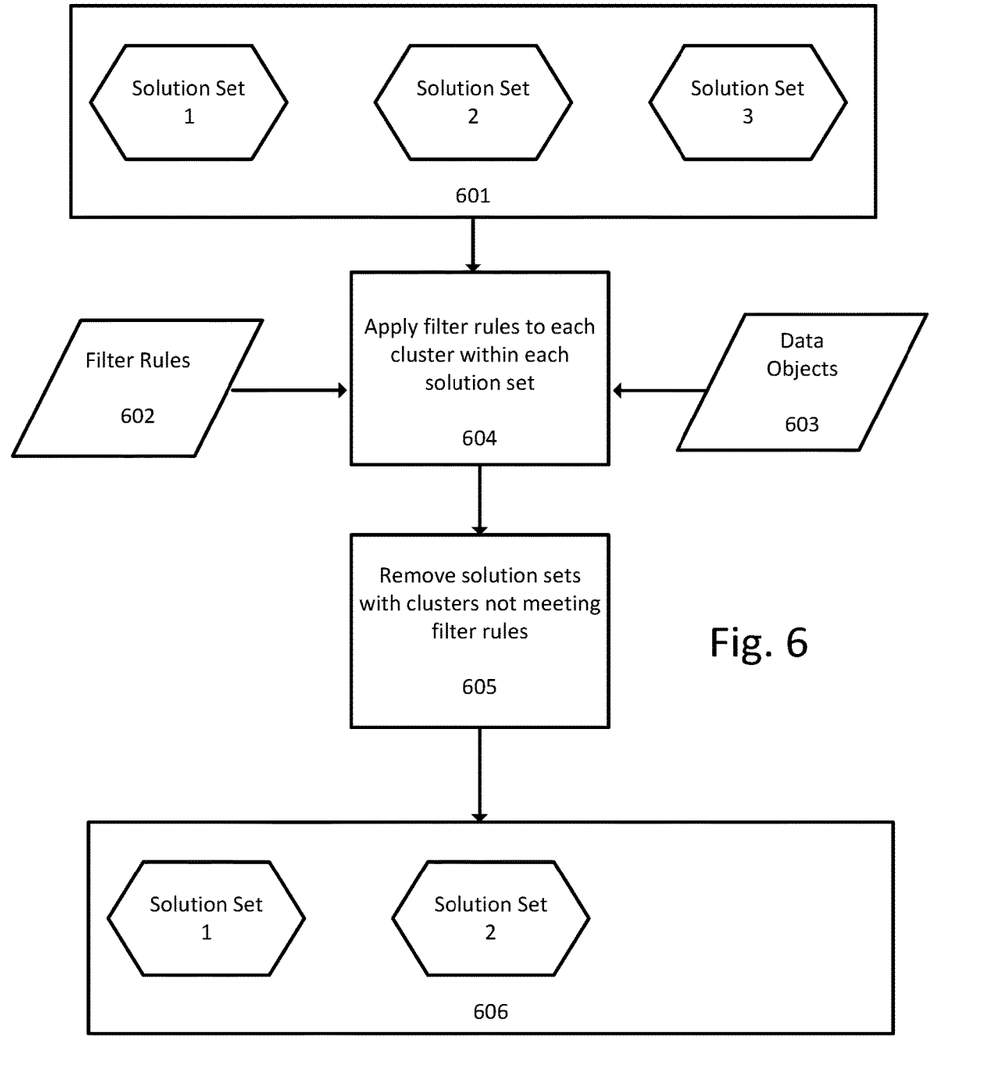
FIG. 6 illustrates a process for removing solution sets from the plurality of solution sets to generate a filtered plurality of solution sets according to an exemplary embodiment.

FIG. 6 illustrates a process for removing solution sets from the plurality of solution sets to generate a filtered plurality of solution sets according to an exemplary embodiment. Filter rules 602 and data objects 603 (including the associated attributes) are provided as input to a step of applying filter rules to each cluster within each solution set. The filter rules can include, for example, filtering out a solution set if a cluster size within that solution set deviates too greatly from a preferred group size of the persons within that cluster (i.e., the persons corresponding to the data objects that correspond to the MD objects), filtering out a solution set if a cluster size within that solution set exceeds a predefined threshold or is less than a predefined threshold, filtering out a solution set if a cluster within that solution set does not have any persons that are willing to host, filtering out a solution set if a cluster within that solution set has an incompatibility between attributes of persons in that cluster (e.g., an availability attribute, an ability to have virtual meetings, an available days attribute, etc.), and/or filtering out a solution set if a cluster within that solution set has too great of a distance between persons in that cluster or between one or more persons and a host.

The filtering step 604 is applied to the solutions sets 601 to identify solution sets for removal, which are then removed at step 605. As shown in box 606, this process results in the removal of solution set 3.

Returning to FIG. 4, at step 403 a solution set is selected from the filtered plurality of solution sets based at least in part on one or more weights associated with one or more attributes in the plurality of attributes.

Figure 7:
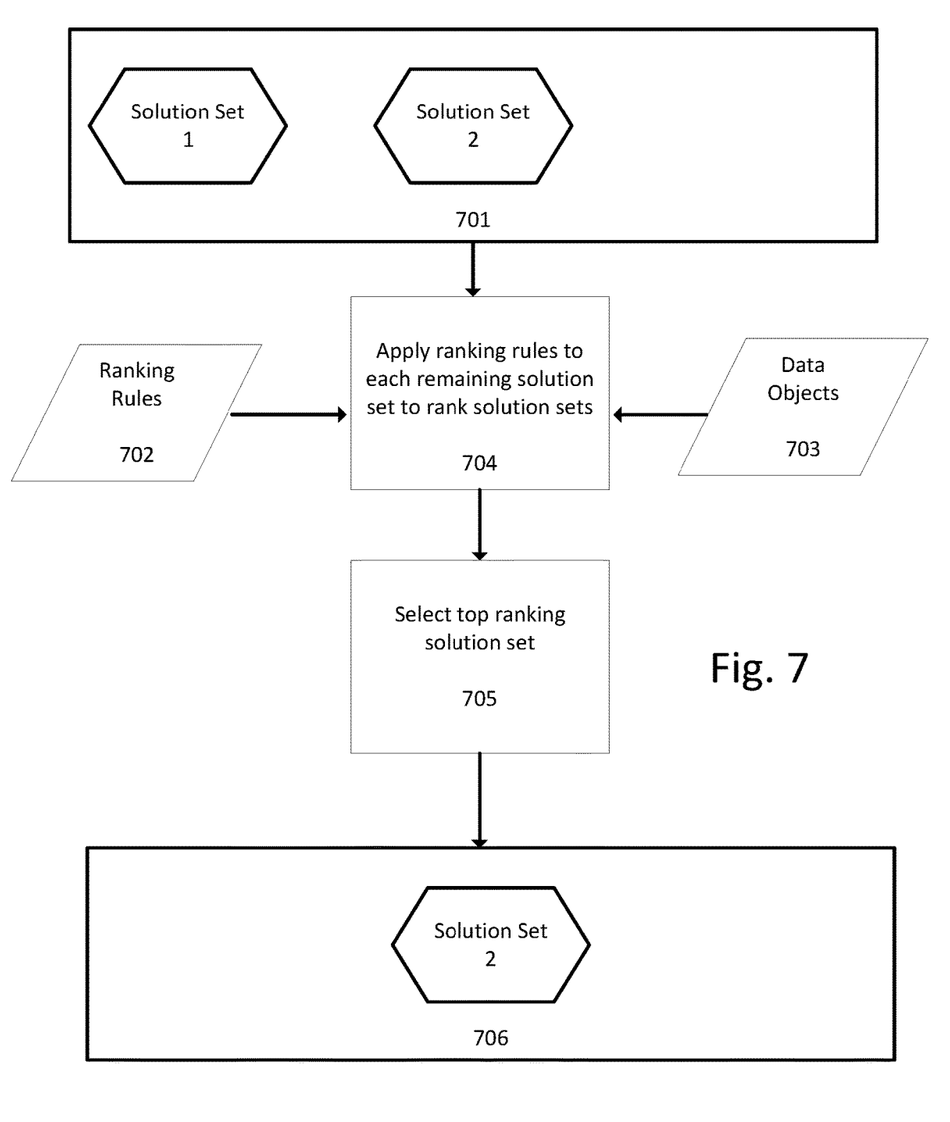
FIG. 7 illustrates an example of the process for selecting a solution set from the filtered plurality of solution sets according to an exemplary embodiment.

FIG. 7 illustrates an example of the process for selecting a solution set from the filtered plurality of solution sets according to an exemplary embodiment. As shown in FIG. 7, a step of applying ranking rules 704 to each remaining solution set to rank the solution sets is applied to the remaining solutions sets 701. This step takes as input ranking rules 702 and data objects 703 (including the plurality of attributes).

In step 704, the ranking rules are used to assign weights to particular attributes of clusters, of MD objects within clusters, or to solution sets. For example, a solution set that has clusters in which persons are, on average, closer to one another than clusters in other solution sets may be assigned a higher weighting and consequently a higher ranking. Weights and ranks can also be assigned on how well the characteristics of each cluster match the desired attributes of the persons within each cluster. For example, whether a cluster size is equal to the desired group size of all persons within that cluster or whether the number of children of all persons within a cluster matches. Many variations are possible, and these examples are not intended to be limiting.

The ultimate solution set weight and rank can be computed based on some aggregation of weights and ranks of clusters within each solution set, for example an average, a median, or a sum of clusters within each solution set. Many variations are possible, and these examples are not intended to be limiting.

The ranking rules and associated weights can be dynamic, changing in response to user feedback, user assessments, or other feedback from the system. For example, a post-grouping/post-circle assessment can be performed for all individuals that have been grouped and used adjust, remove, or add new ranking rules. An assessment, such as the well-being assessment discussed earlier, can serve a benchmark used to evaluate effectiveness and benefit of the groupings. By measuring well-being prior to and after grouping, the system can determine a "return on investment" or improvement to each member's wellbeing. The groups which result in the greatest improvement to well-being (e.g., improvement above a predetermined threshold) can then be analyzed to determine commonalities between the members, attributes of the individual members and of the group as a whole, and statistical characteristics of the clusters and clustering process used to create the groups. The result of this analysis can then be used to adjust the ranking rules and weightings to select for groups which have the desired attributes and create groups in the future with a higher likelihood of improving well-being. The ranking rules and weightings can therefore be based upon a feedback loop from previous successful groups, as well as each user's own weightings.

The system can identify criteria for optimal group selection using the above-described feedback loop to measure characteristics and attributes (individual, interpersonal, and/or aggregate across members of the group) of successful groups. For example, the system can determine that optimal success of a group (as measured, for example, by improvement in well-being scores) occurs when one or more of the following criteria are met: (1) the average wellbeing score of the group is above some threshold value, (2) the members of the group have a certain mix or distribution of attributes or demographics, (3) the age gap or age range between children of participating moms does not exceed a maximum number of months, and/or (4) the ratio of certain Meyers-Briggs personality types to other Meyers-Briggs personality types matches a predetermined ratio known to produce optimal results or the distribution of Meyers-Briggs personality types matches an ideal distribution for optimal results.

After applying 704 the ranking rules 702, a top ranking solution set is selected at step 705. In this example, the top ranking solution is Solution Set 2, as shown in box 706.

Returning to FIG. 4, at step 404 the plurality of data objects are grouped according to the plurality of clusters defined in the selected solution set. This step includes identifying the data objects corresponding to MD objects within each cluster of the selected solution set and grouping the identified data objects together as a group.

Figure 8:
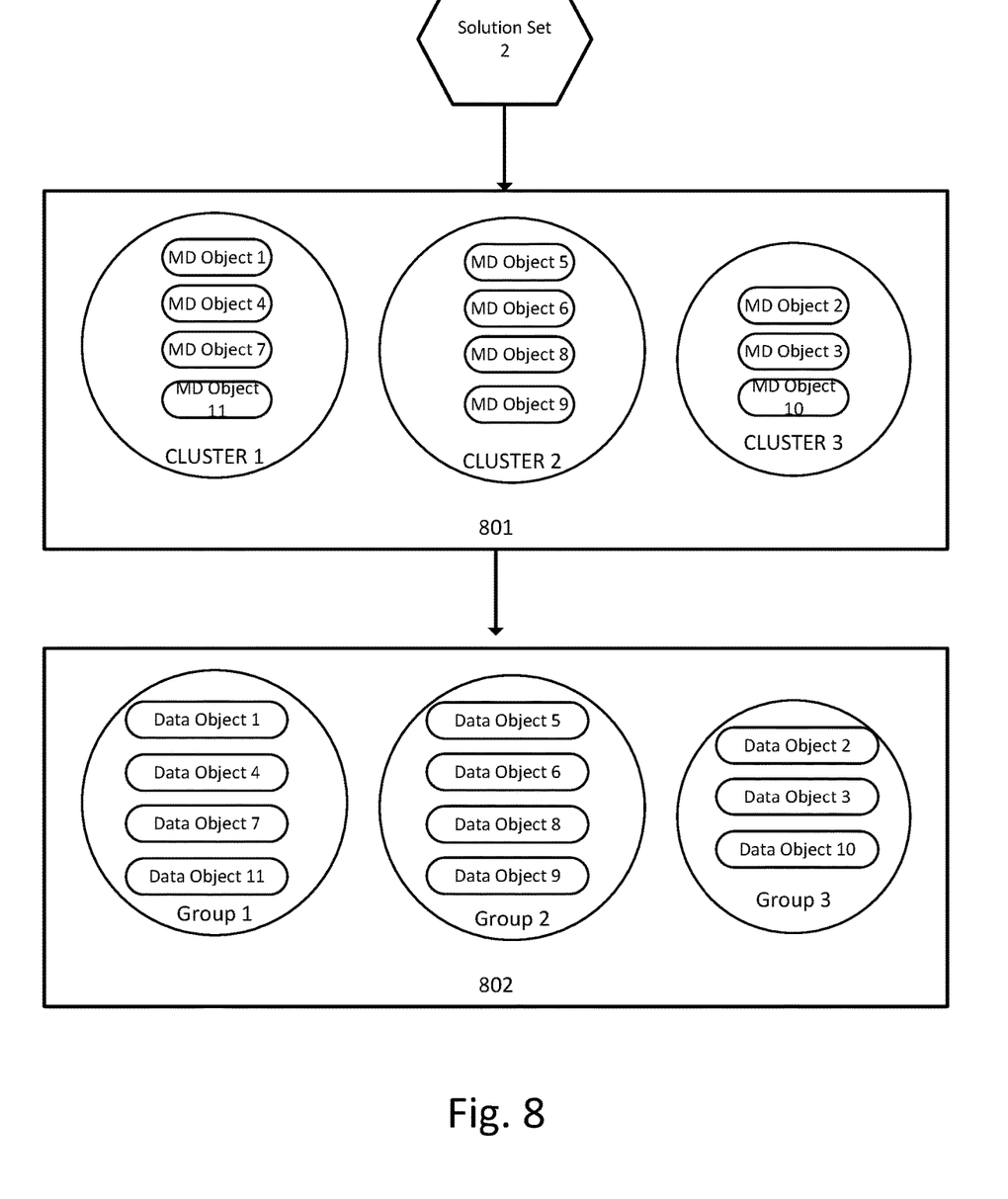
FIG. 8 illustrates an example of grouping a plurality of data objects according to the plurality of clusters defined in the selected solution set according to an exemplary embodiment.

FIG. 8 illustrates an example of grouping a plurality of data objects according to the plurality of clusters defined in the selected solution set according to an exemplary embodiment. As shown in FIG. 8, the selected solution set is Solution Set 2, which includes the clusters shown in box 801. The objects corresponding the MD objects in each cluster are grouped together in groups that correspond to the clusters, as shown in box 802.

Figure 9:
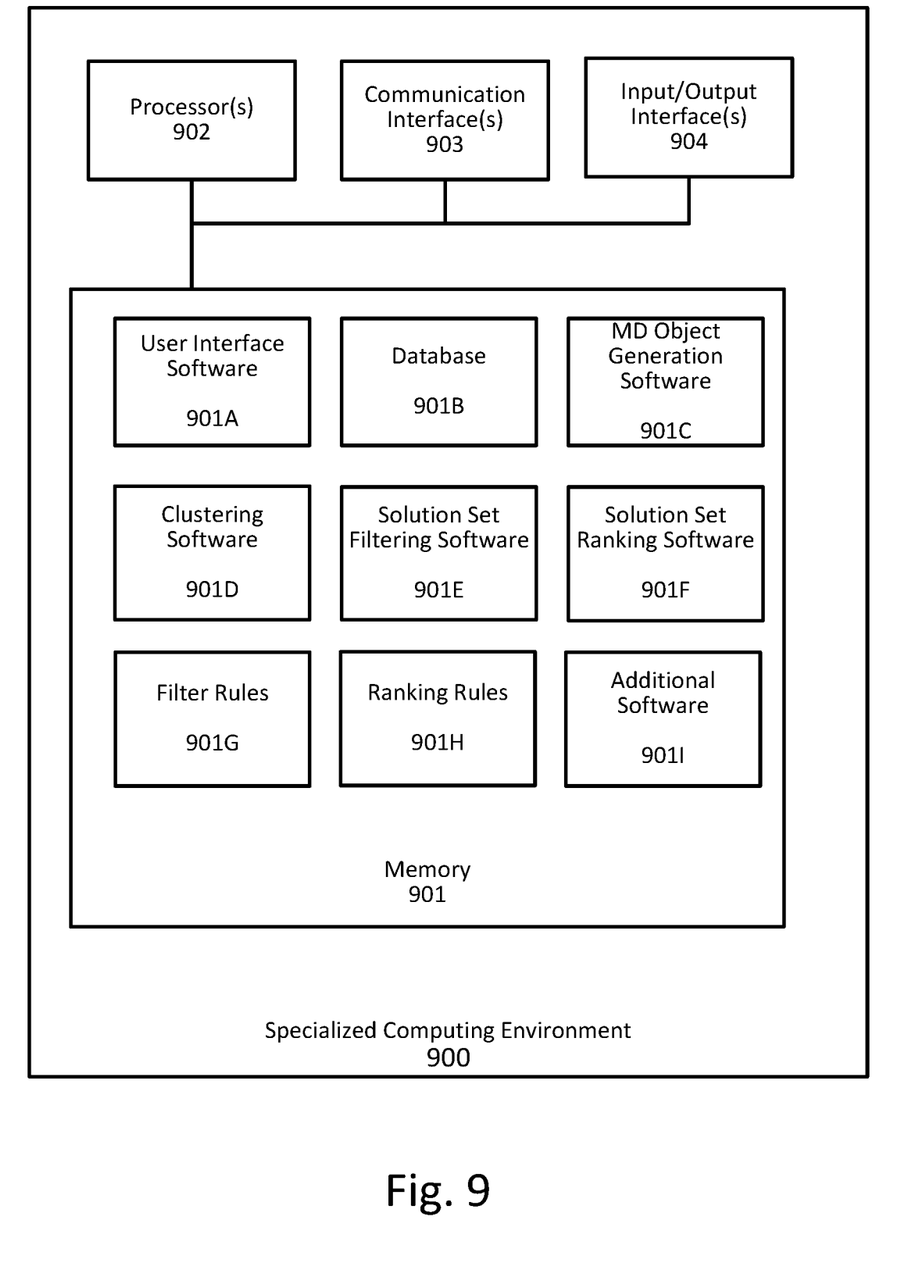
FIG. 9 illustrates the components of the specialized computing environment configured to perform the specialized processes described herein.

FIG. 9 illustrates the components of the specialized computing environment 900 configured to perform the specialized processes described herein. Specialized computing environment 900 is a computing device that includes a memory 901 that is a non-transitory computer-readable medium and can be volatile memory (e.g., registers, cache, RAM), non-volatile memory (e.g., ROM, EEPROM, flash memory, etc.), or some combination of the two.

As shown in FIG. 9, memory 901 can include user interface software 901A, a database 901B that stores the data objects, plurality of attributes, MD objects, generated clusters, solution sets, and all other intermediate data generated by the processes described herein, MD object generation software 901C, clustering software 901D, solution set filtering software 901E, solution set ranking software 901F, filter rules 901G, ranking rules 901H, and any additional software 901I required to implement the specialized processes described herein. Each of the software components in memory 901 store specialized instructions and data structures configured to perform the corresponding functionality and techniques described herein.

All of the software stored within memory 901 can be stored as a computer-readable instructions, that when executed by one or more processors 902, cause the processors to perform the functionality described with respect to FIGS. 1-8.

Processor(s) 902 execute computer-executable instructions and can be a real or virtual processors. In a multi-processing system, multiple processors or multicore processors can be used to execute computer-executable instructions to increase processing power and/or to execute certain software in parallel.

Specialized computing environment 900 additionally includes a communication interface 903, such as a network interface, which is used to communicate with devices, applications, or processes on a computer network or computing system, collect data from devices on a network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 900 further includes input and output interfaces 904 that allow users (such as system administrators) to provide input to the system to set parameters, to edit data stored in memory 901, or to perform other administrative functions.

An interconnection mechanism (shown as a solid line in FIG. 9), such as a bus, controller, or network interconnects the components of the specialized computing environment 900.

Input and output interfaces 904 can be coupled to input and output devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 900.

Specialized computing environment 900 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 1500.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Elements of the described embodiment shown in software may be implemented in hardware and vice versa.

It will be appreciated by those skilled in the art that changes could be made to the embodiments described above without departing from the broad inventive concept thereof. For example, the steps or order of operation of one of the above-described methods could be rearranged or occur in a different series, as understood by those skilled in the art. It is understood, therefore, that this disclosure is not limited to the particular embodiments disclosed, but it is intended to cover modifications within the spirit and scope of the present disclosure as defined by the appended claims.

The invention claimed is:

1. A method executed by one or more computing devices for quantitatively grouping using computational clustering, the method comprising:
   storing, by at least one of the one or more computing devices, a set of data objects corresponding to a set of persons;
   storing, by at least one of the one or more computing devices, a plurality of attributes corresponding to each data object in the set of data objects;
   generating, by at least one of the one or more computing devices, a plurality of multidimensional objects by encoding each data object in the set of data objects as a multidimensional object based at least in part on two or more attributes corresponding to that data object, each multidimensional object corresponding to a data object in the set of data objects;
   applying, by at least one of the one or more computing devices, a clustering algorithm to the plurality of multidimensional objects to generate a plurality of solution sets, each solution set comprising a plurality of clusters of multidimensional objects, each cluster of multidimensional objects comprising at least three multidimensional objects;
   applying, by at least one of the one or more computing devices, one or more dynamic ranking rules to the plurality of solution sets to generate a plurality of weighted solution sets, the one or more dynamic ranking rules being configured to assign one or more weights to one or more attributes associated with at least one solution set in the plurality of solution sets;
   grouping, by at least one of the one or more computing devices, the plurality of data objects according to the plurality of clusters defined in a top-ranked solution set in the plurality of weighted solution sets;
   determining, by at least one of the one or more computing devices, one or more feedback values corresponding to one or more persons in the set of persons, the one or more feedback values being determined after grouping the plurality of data objects according to the plurality of clusters defined in the top-ranked solution set; and
   updating, by at least one of the one or more computing devices, the one or more dynamic ranking rules based at least in part on the one or more feedback values.

2. The method of claim 1, wherein the one or more attributes associated with at least one solution set in the plurality of solution sets comprise one or more of:
   at least one attribute associated with a cluster within the at least one solution set;
   at least one attribute associated with a multidimensional object within the at least one solution set; or
   at least one attribute associated with the at least one solution set.

3. The method of claim 1, wherein the one or more feedback values corresponding to one or more persons comprise one or more of:
   user feedback from the one or more persons;
   an assessment of the one or more persons;
   one or more behaviors of the one or more persons; or
   a group-level assessment of one or more groups corresponding to the top-ranked solution set.

4. The method of claim 1, wherein updating the one or more dynamic ranking rules based at least in part on the one or more feedback values comprises one or more of:
   adjusting one or more weights associated with at least one dynamic ranking rule in the one or more dynamic ranking rules;
   adjusting one or more attributes associated with at least one dynamic ranking rule in the one or more dynamic ranking rules;
   removing at least one dynamic ranking rule in the one or more dynamic ranking rules; or
   adding at least one dynamic ranking rule to the one or more dynamic ranking rules.

5. The method of claim 1, wherein the one or more persons comprise a plurality of persons and wherein determining one or more feedback values corresponding to one or more persons in the set of persons comprises:
   determining a plurality of result values for the plurality of persons, the plurality of persons being grouped in a plurality of groups corresponding to the top-ranked solution set;
   ranking the plurality of groups based at least in part on the plurality of result values;
   determining a top-ranked group in the plurality of ranked groups; and
   determining the one or more feedback values based at least in part on one or more attributes of the top-ranked group.

6. The method of claim 5, wherein the plurality of result values comprise a plurality of well-being scores corresponding to the plurality of persons.

7. The method of claim 5, wherein updating the one or more dynamic ranking rules based at least in part on the one or more feedback values comprises:
   increasing a weight associated with the one or more attributes of the top-ranked group in at least one dynamic ranking rule in the one or more dynamic ranking rules.

8. An apparatus for quantitatively grouping using computational clustering, the apparatus comprising:
   one or more processors; and
   one or more memories operatively coupled to at least one of the one or more processors and having instructions stored thereon that, when executed by at least one of the one or more processors, cause at least one of the one or more processors to:
   store a set of data objects corresponding to a set of persons;
   store a plurality of attributes corresponding to each data object in the set of data objects;
   generate a plurality of multidimensional objects by encoding each data object in the set of data objects as a multidimensional object based at least in part on two or more attributes corresponding to that data object, each multidimensional object corresponding to a data object in the set of data objects;

apply a clustering algorithm to the plurality of multidimensional objects to generate a plurality of solution sets, each solution set comprising a plurality of clusters of multidimensional objects, each cluster of multidimensional objects comprising at least three multidimensional objects;

apply one or more dynamic ranking rules to the plurality of solution sets to generate a plurality of weighted solution sets, the one or more dynamic ranking rules being configured to assign one or more weights to one or more attributes associated with at least one solution set in the plurality of solution sets;

group the plurality of data objects according to the plurality of clusters defined in a top-ranked solution set in the plurality of weighted solution sets;

determine one or more feedback values corresponding to one or more persons in the set of persons, the one or more feedback values being determined after grouping the plurality of data objects according to the plurality of clusters defined in the top-ranked solution set; and update the one or more dynamic ranking rules based at least in part on the one or more feedback values.

9. The apparatus of claim 8, wherein the one or more attributes associated with at least one solution set in the plurality of solution sets comprise one or more of:
at least one attribute associated with a cluster within the at least one solution set;
at least one attribute associated with a multidimensional object within the at least one solution set; or
at least one attribute associated with the at least one solution set.

10. The apparatus of claim 8, wherein the one or more feedback values corresponding to one or more persons comprise one or more of:
user feedback from the one or more persons;
an assessment of the one or more persons;
one or more behaviors of the one or more persons; or
a group-level assessment of one or more groups corresponding to the top-ranked solution set.

11. The apparatus of claim 8, wherein the instructions that, when executed by at least one of the one or more processors, cause at least one of the one or more processors to update the one or more dynamic ranking rules based at least in part on the one or more feedback values further cause at least one of the one or more processors to perform one or more of:
adjusting one or more weights associated with at least one dynamic ranking rule in the one or more dynamic ranking rules;
adjusting one or more attributes associated with at least one dynamic ranking rule in the one or more dynamic ranking rules;
removing at least one dynamic ranking rule in the one or more dynamic ranking rules; or
adding at least one dynamic ranking rule to the one or more dynamic ranking rules.

12. The apparatus of claim 8, wherein the one or more persons comprise a plurality of persons and wherein the instructions that, when executed by at least one of the one or more processors, cause at least one of the one or more processors to determine one or more feedback values corresponding to one or more persons in the set of persons further cause at least one of the one or more processors to:

determine a plurality of result values for the plurality of persons, the plurality of persons being grouped in a plurality of groups corresponding to the top-ranked solution set;
rank the plurality of groups based at least in part on the plurality of result values;
determine a top-ranked group in the plurality of ranked groups; and
determine the one or more feedback values based at least in part on one or more attributes of the top-ranked group.

13. The apparatus of claim 12, wherein the plurality of result values comprise a plurality of well-being scores corresponding to the plurality of persons.

14. The apparatus of claim 12, wherein the instructions that, when executed by at least one of the one or more processors, cause at least one of the one or more processors to update the one or more dynamic ranking rules based at least in part on the one or more feedback values further cause at least one of the one or more processors to:
increase a weight associated with the one or more attributes of the top-ranked group in at least one dynamic ranking rule in the one or more dynamic ranking rules.

15. At least one non-transitory computer-readable medium storing computer-readable instructions for quantitatively grouping using computational clustering that, when executed by one or more computing devices, cause at least one of the one or more computing devices to:
store a set of data objects corresponding to a set of persons;
store a plurality of attributes corresponding to each data object in the set of data objects;
generate a plurality of multidimensional objects by encoding each data object in the set of data objects as a multidimensional object based at least in part on two or more attributes corresponding to that data object, each multidimensional object corresponding to a data object in the set of data objects;
apply a clustering algorithm to the plurality of multidimensional objects to generate a plurality of solution sets, each solution set comprising a plurality of clusters of multidimensional objects, each cluster of multidimensional objects comprising at least three multidimensional objects;
apply one or more dynamic ranking rules to the plurality of solution sets to generate a plurality of weighted solution sets, the one or more dynamic ranking rules being configured to assign one or more weights to one or more attributes associated with at least one solution set in the plurality of solution sets;
group the plurality of data objects according to the plurality of clusters defined in a top-ranked solution set in the plurality of weighted solution sets;
determine one or more feedback values corresponding to one or more persons in the set of persons, the one or more feedback values being determined after grouping the plurality of data objects according to the plurality of clusters defined in the top-ranked solution set; and
update the one or more dynamic ranking rules based at least in part on the one or more feedback values.

16. The at least one non-transitory computer-readable medium of claim 15, wherein the one or more attributes associated with at least one solution set in the plurality of solution sets comprise one or more of:
at least one attribute associated with a cluster within the at least one solution set;

at least one attribute associated with a multidimensional object within the at least one solution set; or at least one attribute associated with the at least one solution set.

17. The at least one non-transitory computer-readable medium of claim 15, wherein the one or more feedback values corresponding to one or more persons comprise one or more of:

user feedback from the one or more persons;

an assessment of the one or more persons;

one or more behaviors of the one or more persons; or a group-level assessment of one or more groups corresponding to the top-ranked solution set.

18. The at least one non-transitory computer-readable medium of claim 15, wherein the instructions that, when executed by at least one of the one or more processors, cause at least one of the one or more processors to update the one or more dynamic ranking rules based at least in part on the one or more feedback values further cause at least one of the one or more processors to perform one or more of:

adjusting one or more weights associated with at least one dynamic ranking rule in the one or more dynamic ranking rules;

adjusting one or more attributes associated with at least one dynamic ranking rule in the one or more dynamic ranking rules;

removing at least one dynamic ranking rule in the one or more dynamic ranking rules; or adding at least one dynamic ranking rule to the one or more dynamic ranking rules.

19. The at least one non-transitory computer-readable medium of claim 15, wherein the one or more persons comprise a plurality of persons and wherein the instructions that, when executed by at least one of the one or more processors, cause at least one of the one or more processors to determine one or more feedback values corresponding to one or more persons in the set of persons further cause at least one of the one or more processors to:

determine a plurality of result values for the plurality of persons, the plurality of persons being grouped in a plurality of groups corresponding to the top-ranked solution set;

rank the plurality of groups based at least in part on the plurality of result values;

determine a top-ranked group in the plurality of ranked groups; and determine the one or more feedback values based at least in part on one or more attributes of the top-ranked group.

20. The at least one non-transitory computer-readable medium of claim 19, wherein the plurality of result values comprise a plurality of well-being scores corresponding to the plurality of persons.

21. The at least one non-transitory computer-readable medium of claim 19, wherein the instructions that, when executed by at least one of the one or more processors, cause at least one of the one or more processors to update the one or more dynamic ranking rules based at least in part on the one or more feedback values further cause at least one of the one or more processors to:

increase a weight associated with the one or more attributes of the top-ranked group in at least one dynamic ranking rule in the one or more dynamic ranking rules.

* * * * *